(12) United States Patent
Dennis

(10) Patent No.: US 7,798,281 B2
(45) Date of Patent: Sep. 21, 2010

(54) METHOD AND APPARATUS FOR ENHANCING VEHICLE PERFORMANCE

(76) Inventor: Kenneth John Dennis, RMB 1015 Chesney Road, Goorambat VIC (AU) 3725

( * ) Notice: Subject to any disclaimer, the term of this patent is extended or adjusted under 35 U.S.C. 154(b) by 0 days.

(21) Appl. No.: 12/405,545

(22) Filed: Mar. 17, 2009

(65) Prior Publication Data

US 2009/0173565 A1 Jul. 9, 2009

Related U.S. Application Data

(63) Continuation of application No. 11/311,723, filed on Dec. 19, 2005, now abandoned.

(51) Int. Cl.
*B62D 5/06* (2006.01)
(52) U.S. Cl. ..................................................... 180/417
(58) Field of Classification Search ................. 180/417, 180/421, 422
See application file for complete search history.

(56) References Cited

U.S. PATENT DOCUMENTS

| | | | |
|---|---|---|---|
| 4,079,805 A * | 3/1978 | Rau | 180/421 |
| 4,273,029 A | 6/1981 | Sheppard | |
| 4,566,477 A | 1/1986 | Barker et al. | |
| 4,570,667 A * | 2/1986 | Masica et al. | 137/115.1 |
| 4,947,951 A * | 8/1990 | Miller | 180/423 |
| 5,330,024 A | 7/1994 | Emori et al. | |
| 5,544,715 A | 8/1996 | Phillips | |
| 6,394,219 B1 | 5/2002 | Gilbert et al. | |
| 6,450,286 B1 | 9/2002 | Rui et al. | |
| 6,820,714 B2 | 11/2004 | Schymczyk et al. | |
| 6,931,981 B2 * | 8/2005 | Urbach | 91/459 |
| 2005/0126165 A1 | 6/2005 | Honda et al. | |

FOREIGN PATENT DOCUMENTS

GB 1486910 9/1977

* cited by examiner

*Primary Examiner*—Kevin Hurley
(74) *Attorney, Agent, or Firm*—Hoffmann & Baron, LLP

(57) ABSTRACT

A method and system for improving steering performance of a vehicle is disclosed. The method and system resides in increasing the flow size of the hydraulic oil flow path from a pump (3) to a steering unit (5). This can be done by modifying the size of a conduit (4) between the pump (3) and unit (5) or by modifying the bore diameter of hose fittings (36, 37).

25 Claims, 13 Drawing Sheets

METHOD AND APPARATUS FOR ENHANCING VEHICLE PERFORMANCE

CROSS-REFERENCE TO RELATED APPLICATIONS

This application is a continuation of U.S. application Ser. No. 11/311,723, filed Dec. 19, 2005, now pending.

FIELD OF THE INVENTION

This invention relates to a method and apparatus for enhancing vehicle performance and, in particular, to reducing problems associated with performance due to hydraulic power steering systems used in vehicles.

BACKGROUND OF THE INVENTION

Many vehicles and, in particular, truck and tractor vehicles such as prime movers which tow trailers, four-wheel drives and other off-road vehicles suffer from various problems under particular driving conditions, which include general rough ride, vibration and shuddering on rough roads, steering feedback, pulling consistently in one direction, understeer while cornering, heavy excessive tyre wear, heaving steering, wander across the road and the need for constant steering corrections whilst the vehicle is being driven.

These problems can make it difficult to drive a vehicle and, in particular, a large vehicle in some conditions, which can result in driver fatigue, accident and also significant wear on tyres and other steering components.

SUMMARY OF THE INVENTION

The present inventor has found that the above problems relate directly to hydraulic steering systems and, in particular, to the amount of hydraulic fluid which is able to flow to a steering box to control steering. In particular, it has been found that the forces created on the steering box when a steering change is made by rotating a steering wheel and which are provided by hydraulic fluid, is often insufficient to counteract forces on the vehicle wheels caused by travel of the vehicle over the terrain on which the vehicle is driving. This in turn can result in greater momentary forces being applied to the wheels by the terrain than by the hydraulic fluid. Thus, although the vehicle does turn in response to movement of the steering wheel and the application of hydraulic fluid to the steering box, the momentary forces cause feedback into the steering system which create the rough ride, vibration and shuddering and the other problems referred to above.

The present inventor has found that by increasing the amount of fluid which can be supplied to the steering box, the above problems are greatly reduced, if not eliminated altogether, thereby providing much better vehicle steering performance, less wear on steering components and tyres and therefore greater driving satisfaction from the point of view of comfort and safety, and also in relation to the need for maintenance of the steering system.

Thus, the present invention is based on the concept of increasing the amount of hydraulic fluid which is supplied to the steering box during operation of the vehicle.

The invention in a first aspect provides a method of improving vehicle performance of a vehicle which has a hydraulic power steering system comprising a hydraulic fluid reservoir, a pump for pumping hydraulic fluid from the reservoir and a steering unit operably connected to a mechanical steering system and to be activated by supply of hydraulic fluid by the pump to the unit, the hydraulic power steering system having a flow path for supply of hydraulic fluid by the pump to the unit of a first size which is provided at manufacture of the steering system, said method comprising:

modifying the size of the flow path for the supply of hydraulic fluid from the pump to the unit so that the flow path is of a size greater than the said first size so as to increase the amount of flow of fluid to the steering unit compared to that which occurs with the flow path having the said first size to thereby improve steering performance of the vehicle.

Since the flow path is of increased size, the amount of fluid which flows to the steering unit is increased, thereby creating greater force to maintain the wheels in position, as set by rotation of the steering wheel so that the force created by contact of the wheels over terrain does not overcome the force created by the hydraulic fluid and therefore maintains the wheels in their correct orientation. This therefore reduces all of the problems referred to above, thereby greatly improving vehicle performance.

In one embodiment the step of modifying the flow path comprises changing a component of the flow path to increase the size of the flow path.

In another embodiment the step of modifying the size of the flow path comprises altering a component of the flow path to increase the size of the flow path.

Thus, the flow path can be altered by either removing an old part and inserting a new part, or by altering an existing part, such as by enlarging orifice sizes or the like to increase the size of the flow path.

Preferably the steering system includes a hydraulic fitting attached to the pump for connecting the pump to a supply line, and a hydraulic fitting connected to the steering unit for connecting the supply line to the steering unit, and the step of increasing the size of the flow path comprises modifying the bore size of the hydraulic fittings to increase the size of the bores.

Again, this modification can taken place by altering the bore size by increasing the bore size of the hydraulic fittings or completely replacing the hydraulic fittings with fittings having a larger bore size.

The invention also provides a method of enhancing steering performance of a vehicle which has a hydraulic power steering system comprising a hydraulic fluid reservoir, a pump for pumping hydraulic fluid from the reservoir and a steering unit operably connected to a mechanical steering system and to be activated by supply of hydraulic fluid by the pump to the unit, the hydraulic power steering system having a flow path for supply of hydraulic fluid by the pump to the unit, said method comprising:

increasing the size of the flow path for the supply of hydraulic fluid from the pump to the unit.

In one embodiment the step of increasing the size of the flow path comprises changing a component of the flow path to increase the size of the flow path.

In another embodiment the step of increasing the size of the flow path comprises altering a component of the flow path to increase the size of the flow path.

Preferably the steering system includes a hydraulic fitting attached to the pump for connecting the pump to a supply line, and a hydraulic fitting connected to the steering unit for connecting the supply line to the steering unit, and the step of increasing the size of the flow path comprises modifying the bore size of the hydraulic fittings to increase the size of the bores.

The invention also provides a hydraulic power steering system for a vehicle comprising:

a hydraulic fluid reservoir;
a steering unit coupled to a mechanical actuating part of a mechanical steering system for control by rotation of a steering wheel to turn wheels of the vehicle;
a pump for pumping hydraulic fluid from the reservoir to the steering unit;
a pressure supply conduit between the pump and the steering unit for the supply of fluid pumped by the pump from the reservoir to the steering unit;
a return conduit for supplying hydraulic fluid from the steering unit to the reservoir; and
wherein the pump, supply conduit and steering unit define a flow path having a size which is set to supply hydraulic fluid to the steering unit so as to substantially eliminate one or more of the following unwanted conditions:
(a) erratic deviations from a steered path;
(b) excessive feedback to the steering wheel caused by road unevenness;
(c) excessive understeer by cornering;
(d) excessive heavy steering;
(e) excessive slow response of power assist of the steering system;
(f) excessive tyre wear;
(g) cabin noise and vibration or shudder;
(h) rough ride on uneven surfaces.

In one embodiment the flow path has a minimum cross-sectional dimensional of not less than from about 9.8 to 10.8 mm and preferably 9.8 to 10.5 mm and most preferably 10.0 mm.

In terms of percentage preferably the change in the size of the flow path is produced by changing a component of the flow path so the flow path provided by that component is increased in size from 8 to 14% and most preferably about 11.5 to 11.8%.

In the case of European trucks where a fitting has a flow path defined by a central hole of about 6 to 8 mm diameter and a number of side holes from 3 to 5 mm in diameter, the flow path is increased in size by increasing the diameter of each of the small holes by about 0.5 mm and the central hole by about 1 mm. In terms of percentage increase in flow path size the increase from a small hole diameter of 3 mm is in the range of 20% to 45% and most preferably about 36% substantially linearly down to, in the case of a small hole diameter of about 5 mm from 10% to 20% and preferably about 16.5%.

BRIEF DESCRIPTION OF THE DRAWINGS

A preferred embodiment of the invention will be described, by way of example, with reference to the accompanying drawings in which.

DETAILED DESCRIPTION OF THE PREFERRED EMBODIMENT

Figure 1:
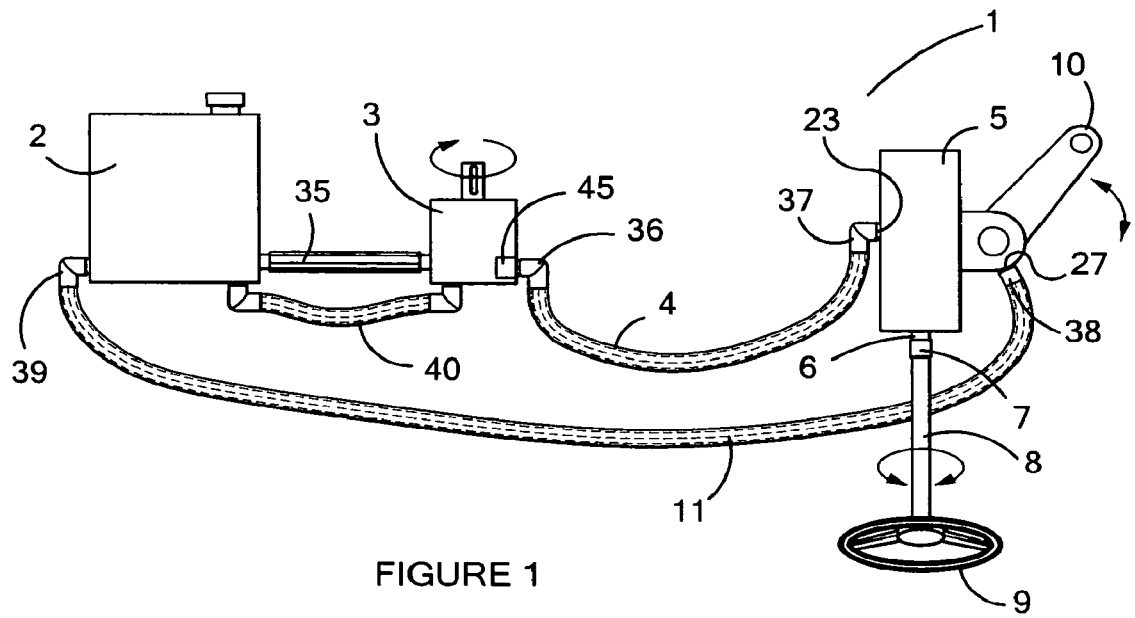
FIG. 1 is a schematic view of a vehicle steering system according to the preferred embodiment of the invention.

FIG. 1 shows in semi-schematic form a hydraulic circuit of a hydraulically operated power steering system 1 for vehicles. From a reservoir 2, hydraulic fluid is drawn into an engine-driven pump 3 via a supply line 35. The pump 3 is of fixed-displacement type, and is typically of the sliding-vane type that is well known in the art. From the pump 3, hydraulic fluid is delivered through a pressure line 4 to a power steering unit 5. A return line 40 from pump 3 is provided to return fluid to reservoir 2 in the event of an integral relief valve (not shown) in pump 3 being opened.

The unit 5 has an input shaft 6 which is coupled via a coupling 7 to shaft 8 of a steering wheel 9 of the vehicle (not shown). The purpose of the unit 5 is to cause rotation of a pitman arm 10 in response to inputs from the steering wheel 9, with torque applied to the steering wheel 9 being magnified hydraulically. The pitman arm 10 is connected to other mechanical components (not shown) which in turn steer road wheels (not shown) of the vehicle in known manner. A line 11 is provided to return hydraulic fluid from the steering unit 5 to the reservoir 2.

System 1 is simplified and illustrative only, as many variations occur in practice. For example, an additional line (not shown) may be provided between the steering unit 5 and reservoir 2 for return of fluid passing through unloading valves under full-lock conditions or through a relief valve in unit 5. For further example, in some systems a diverting valve (not shown) may be provided in line 4 to return a proportion of hydraulic fluid directly to reservoir 2 via a further return line (not shown) in light load conditions or when pump output is higher than needed.

Figure 2:
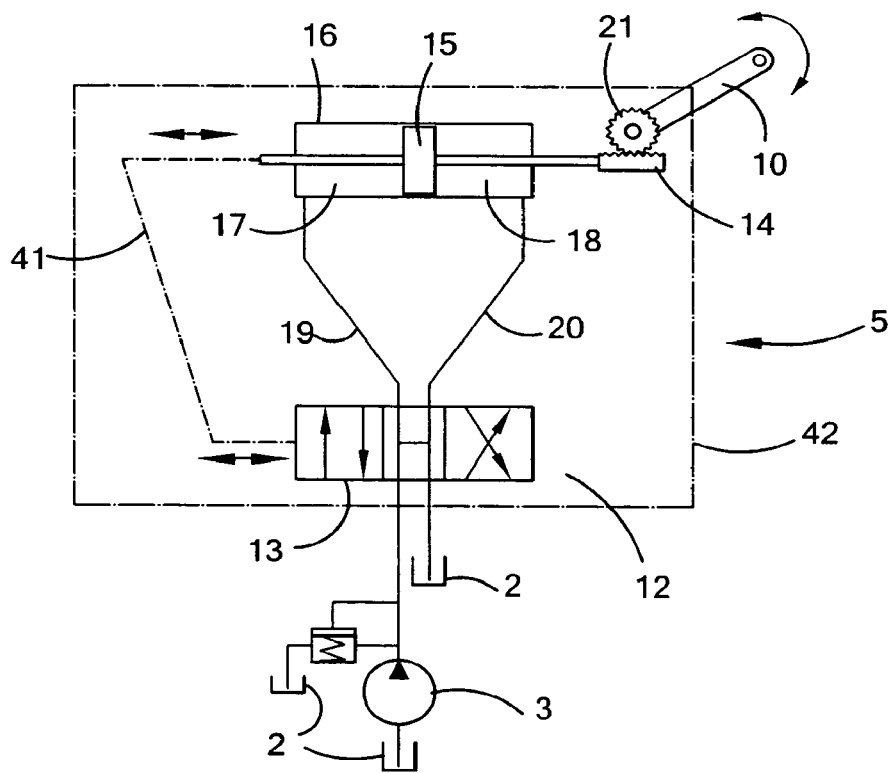
FIG. 2 is a schematic diagram of the fluid circuit of FIG. 1.
Figure 3:
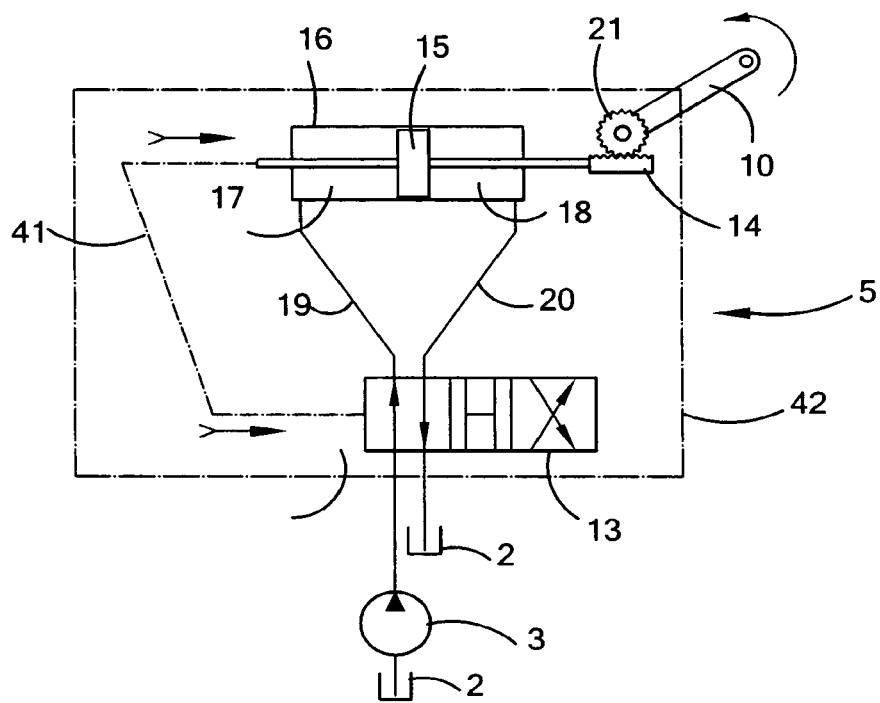
FIG. 3 and FIG. 4 are diagrams similar to FIG. 2 but in different operational conditions.
Figure 4:
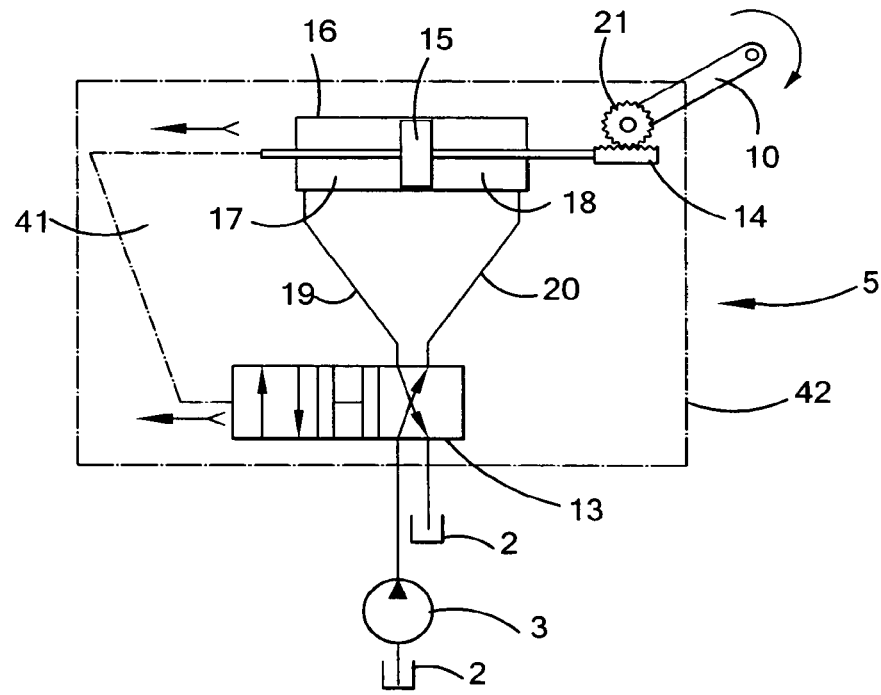
Figure 5:
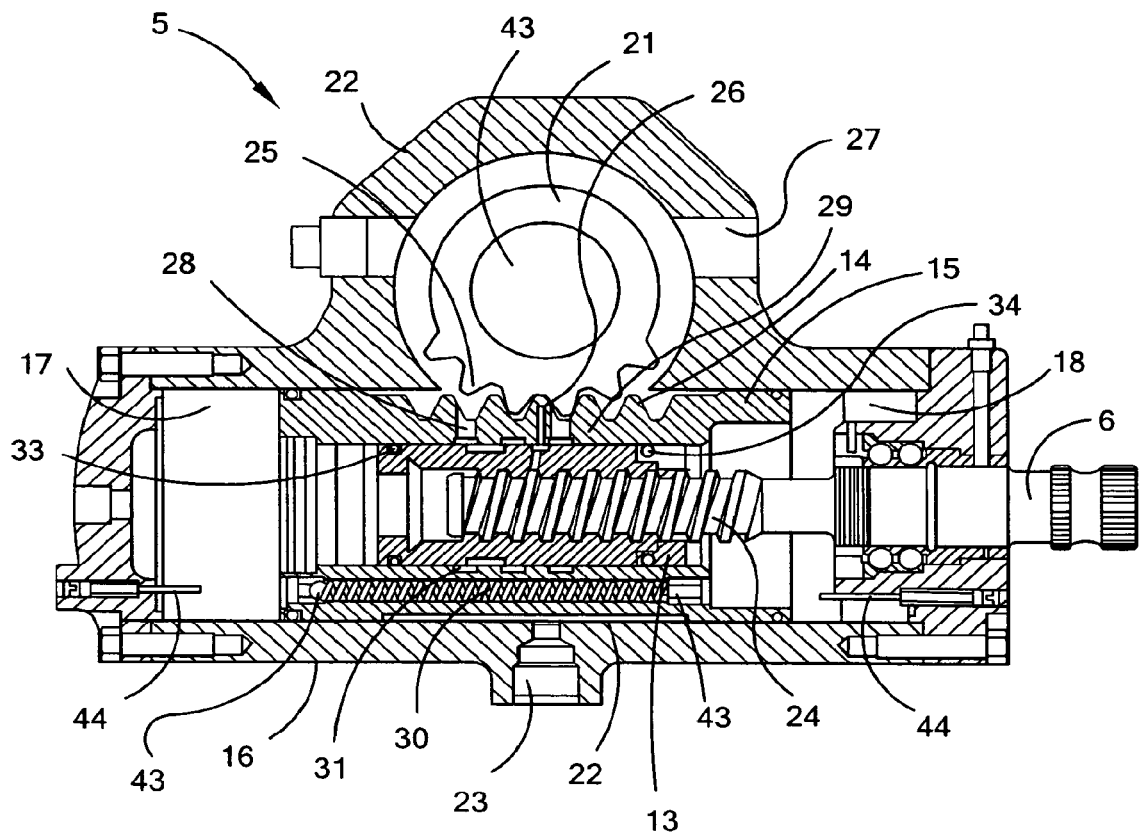
FIG. 5 is a cross-sectional view of a power steering unit according to one embodiment of the invention.

FIGS. 2 to 4 show semi-schematically the hydraulic circuit of system 1. FIG. 5 shows one possible physical form of power steering unit 5, in cross section. The particular unit 5 shown is manufactured by R.H. Sheppard Co., Inc. of the USA.

Referring to FIGS. 2 to 4, a valve 12 is provided, and is represented in a manner that is conventional. In a manner described below, rotation of steering wheel 9 causes linear movement of spool 13. The pitman arm 10 is rotated by a pinion 21 engaging with a rack 14. The rack 14 is in turn moved by a piston 15 which slides in a cylinder 16 whose closed ends define chambers 17 and 18. Chambers 17 and 18 are in fluid communication with valve 12 via passages 19 and 20. Chain dotted line 41 is intended to indicate a feedback link between piston 15 and spool 13 as described below. Boundary line 42 is intended to show what components and conduits are internal to unit 5.

FIG. 2 shows the spool 13 in the position it assumes when there is no steering input, as when the vehicle is travelling straight ahead. In this position, hydraulic fluid supplied by pump 3 circulates through unit 5, but returns to the reservoir 2. Pump 3 develops only enough pressure to overcome pressure losses in the system.

FIG. 3 shows the spool 13 moved (by rotation of shaft 6) to cause hydraulic fluid to flow into chamber 17 and out of chamber 18. Piston 15 thus moves in cylinder 16, so that rack 14 rotates pitman arm 10. FIG. 4 shows the spool moved in an opposite direction (by rotation of shaft 6 in a direction opposite to that of FIG. 3). Hydraulic fluid then flows into chamber 18 and out of chamber 17 so that pitman arm 10 rotates in the opposite direction to that of FIG. 3.

As discussed below, unit 5 is arranged so that movement of piston 15 follows movement of spool 13, and tends to restore spool 13 to its neutral position as shown in FIG. 2. Moreover, as spool 13 moves progressively between the neutral and two extreme positions shown in FIGS. 2, 3 and 4, hydraulic fluid flow to and from chambers 17 and 18 increases smoothly with the difference between the positions of cylinder 15 and spool 13. For these reasons, unit 5 is a servomechanism, with movements of pitman arm 10 corresponding closely to movements of the input shaft 6. Pump 3 develops the pressure required to achieve the necessary movement of the pitman arm 10 against any resistance met by the arm 10.

In FIG. 5 can be seen the input shaft 6, spool 13, rack 14, pinion 21, piston 15, cylinder 16 and chambers 17 and 18. An extension 24 of input shaft 6 is threadably engaged in valve spool 13, which is prevented from rotating, so that rotation of shaft 6 causes linear movement of spool 13 relative to cylinder 16. Shaft 43 is secured to pinion 21 and pitman arm 10 (not shown in FIG. 5). Rack 14 is integral with (machined on) the piston 15 and pinion 21 is accommodated in a casing 22 that is integrally formed with cylinder 16.

An inlet port 23 is provided in cylinder 16 and an outlet port 27 is provided in casing 22. Passages 19 and 20 (see FIG. 2) are not visible in FIG. 5, but are internal passages in piston 15 and in the neutral configuration (corresponding to FIG. 2) shown in FIG. 5, extend from openings in piston 15 opposite peripheral grooves 25 and 26 of spool 13 to chambers 17 and 18. Peripheral grooves 31 and 32 in piston 15 are in fluid communication with outlet port 27 via passages 28 and 29 (FIG. 5) and the interior of casing 22. A groove 30 in piston 15 between grooves 31 and 32 is always in fluid communication (via a passage not shown in FIG. 5) with inlet portion 23. In the position shown in FIG. 5, grooves 25 and 26 in spool 13 receive equal quantities of fluid from groove 30, are in fluid communication with chambers 17 and 18 via passages 19 and 20 and discharge fluid to port 27 via grooves 31 and 32 and passages 28 and 29. The arrangements set out in this paragraph thus provide the "open-centre" connections shown in the central part of spool 13 in FIG. 2. That is, in the position of FIG. 5, fluid passages from port 23 to port 27 and the pressure at port 23 is only that needed to overcome flow losses through unit 5 and return line 11.

Due to the relative positions and dimensions of grooves 25, 26, 30, 31 and 32, movement of spool 13 away from the position shown in FIGS. 2 and 5 causes hydraulic fluid to flow into one of chambers 17 and 18 and out of the other, in such a sense as to reduce the relative displacement of piston 15 and spool 13 from the neutral position shown in FIGS. 2 and 5 and so to cause piston 15 to follow movement of spool 13. Thus, unit 5 acts as a servomechanism, the "error signal" of the servomechanism being the displacement of piston 15 relative to that of spool 13 and away from the balanced position shown in FIG. 5. During piston 15 movement, the pressure difference between chambers 17 and 18, hence the pressure delivered by pump 3, will increase to a degree dependent on the resistance to movement of pitman arm 10.

The servomechanism action described above will by itself keep piston 15 and spool 13 together (save for a slight lagging behind of piston 15 when spool 13 is in motion, and a small dead zone when spool 13 is stationary, as is well known). In addition, spool 13 is held mechanically in place in piston 15 by centring springs 33 and 34. These are arranged to bias spool 13 towards the position shown in FIGS. 2 and 5. Springs 33 and 34 provide a degree of "road feel" to a driver through the steering wheel 9, by transmitting to shaft extension 24 a force corresponding to the position difference between spool 13 and piston 15. This force increases as the torque required by pitman arm 10, hence the demanded power assistance, increases. The helix angle of the thread on extension 24 is such that the force appears as torque at the steering wheel 9.

Unit 5 has unloading valves 43 operated by plungers 44 at opposing ends of cylinder 16 when piston 15 approaches the limits of its travel. Unloading valves of this type are well known. They will therefore not be further described here.

Very surprisingly, it has been found that the previously described problems, when encountered in existing equipment, can be significantly alleviated in many cases by modifying certain parts in the system 1 that are external to the actual steering unit 5. The changes therefore do not require rebuilding or replacing or, normally, even removal of the unit 5. Nor is any major component required to be added. This is a very significant advantage in reducing costs.

Specifically, the method involves modifying any or all of the components and lines through which hydraulic fluid flows as it passes from pump 3 to the inlet port 23 of steering unit 5 to increase flow of fluid.

Referring back to FIG. 1, the steps of which at least one is followed in applying the method of the invention are as follows:

enlarge the size of the pump 3 outlet orifice 45;
enlarge the bores of elbow-type fitting 36 that is fitted at the pump 3 outlet;
enlarge the bores of elbow-type fitting 37 at the inlet port 23 of unit 5;
provide a larger-bore supply line 4.

Most preferably the size of the flow path is increased by enlarging the size of the bore of only the fitting 37.

All of the above modifications are ways to increase flow of hydraulic fluid in the pressure line 4 and its associated fittings 36, 37 and 45 in the system 1. It is to be understood that the listed steps above are illustrative only, being specific to system 1, and in systems (not shown) with different numbers, types and arrangements of fittings, intermediate components such as valves, and lines the above list of steps would be modified to correspond to the differing lines, components and fittings. The overall aim in every case is to secure reduced pressure/flow losses in the pump-to-steering-unit conduit, sufficiently to improve steering performance.

The choice of steps to be followed for a given system, and in each chosen step the degree to which bores are enlarged or other modifications made to reduce losses and secure a satisfactory improvement in steering performance, will depend on the system's specific characteristics. However, suitable choices of the items to be modified or replaced, and the extent of each change, can be found by routine trial and error based on the above teachings.

Figure 6:
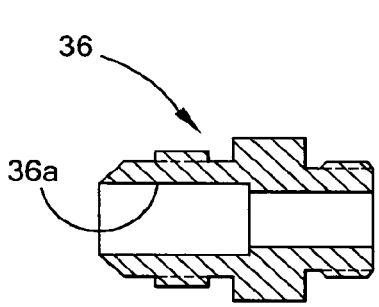
FIG. 6 is a cross-sectional view of a fitting of one embodiment of the invention.
Figure 7:
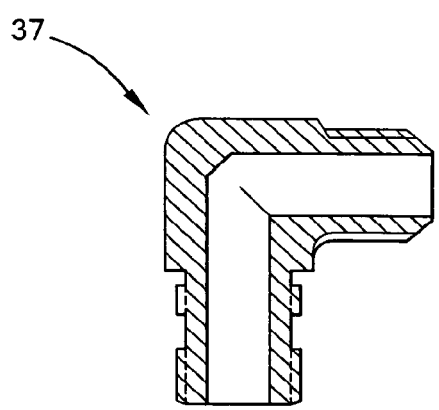
FIG. 7 is a cross-sectional view of a second fitting according to one embodiment of the invention.

Although FIG. 1 shows that the fittings 36 and 37 are both elbow fittings, the fittings 36 and 37 may both be straight fittings or one of the fittings may be an elbow fitting and the other a straight fitting. Specifically, as is shown in FIG. 6, the fitting 36 is a straight fitting which has a minimum bore size of 10.5 mm. In the embodiment of FIG. 6, the bore is circular and therefore the minimum diameter of the bore is 10.5 mm. As is apparent from FIG. 6, the bore has an enlarged diameter section 36a which has a diameter of 12 mm and which locates in the pump 3. FIG. 7 shows the fitting 37 is an elbow fitting in which the minimum bore diameter is 10.5 mm.

Test Example 1

FIGS. 8 to 16 show graphs illustrating test results obtained using a 1989 model Ford LT 9000 6×4 vehicle. In the graphs forming these figures, the traces identified in each graph are as follows: the letter S relates to the vehicle in the standard unmodified condition; the letter M refers to the modification to the flow path referred to above; "pressure pump out" is the pressure at the outlet of the pressure pump 3; "pressure steering box in" is the pressure at the inlet of the steering unit 5; and the temperature is the instantaneous temperature in the fluid reservoir 2.

During the course of tests, the pressure was also monitored at the outlet of the steering unit 5 and at the inlet of the fluid reservoir 2, but the pressure variations were insignificant and the results are therefore not included in the graphs.

Figure 8:
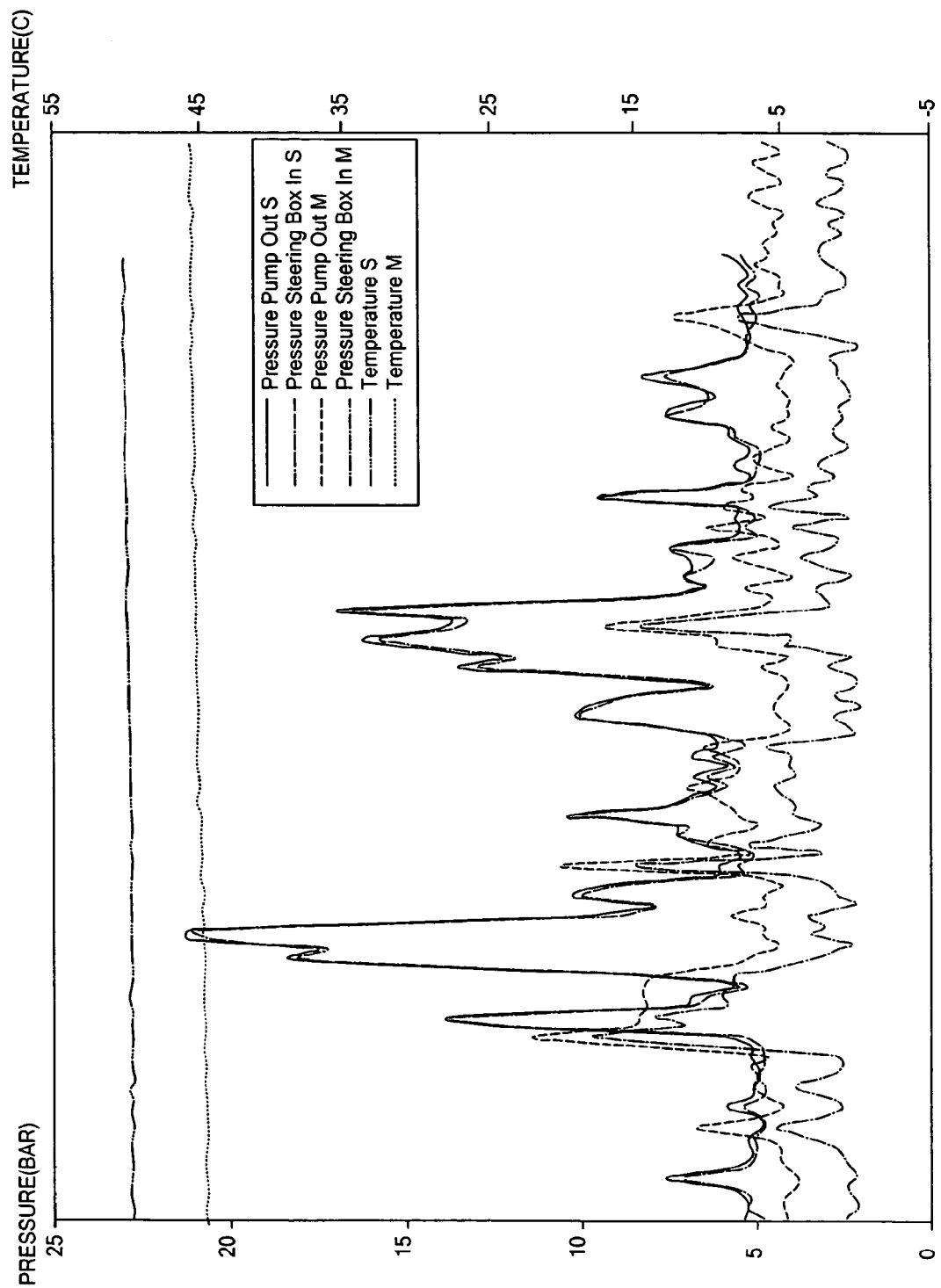
FIGS. 8, 9, 10, 11, 12, 13, 14, 15, 16 and 17 are graphs showing comparison tests of the embodiment of the present invention compared to conventional hydraulic fluid flow rates.

FIG. 8 relates to a test in which the left hand tyres of the vehicle were off the road bitumen and road shoulder. The vehicle was driven at approximately 80 km/h with the left hand tyres on the edge of the bitumen and gravel shoulder of the road. The test attempts to show the corrections necessary by the driver when negotiating this type of condition on the road. Test Length—approximately 18 seconds.

The results of this test show that a variation exists in the operating pressures of the high pressure side of the steering system from the standard to modified version of the subject vehicle. The standard vehicle's average operating pressure is approximately 2 bar (28 psi) higher than that of the modified vehicle. Additionally, the standard vehicle's operating temperature is approximately 4-5° C. higher than that of the modified vehicle.

The larger peaks in the chart indicate a steering input by the driver of the vehicle to either correct the path of the vehicle or a counteractive input by the driver in response to feedback received through the steering wheel from the steer tyres i.e. opposing the motion. The peaks in the modified vehicle are smaller than those of the standard vehicle and their duration is shorter.

Again, it should be noted that a variation of approximately 2 bar (28 psi) exists between the pressure at the pump output to the pressure at the inlet of the steering box on the modified vehicle. These pressures are almost identical on the standard vehicle.

Figure 9:
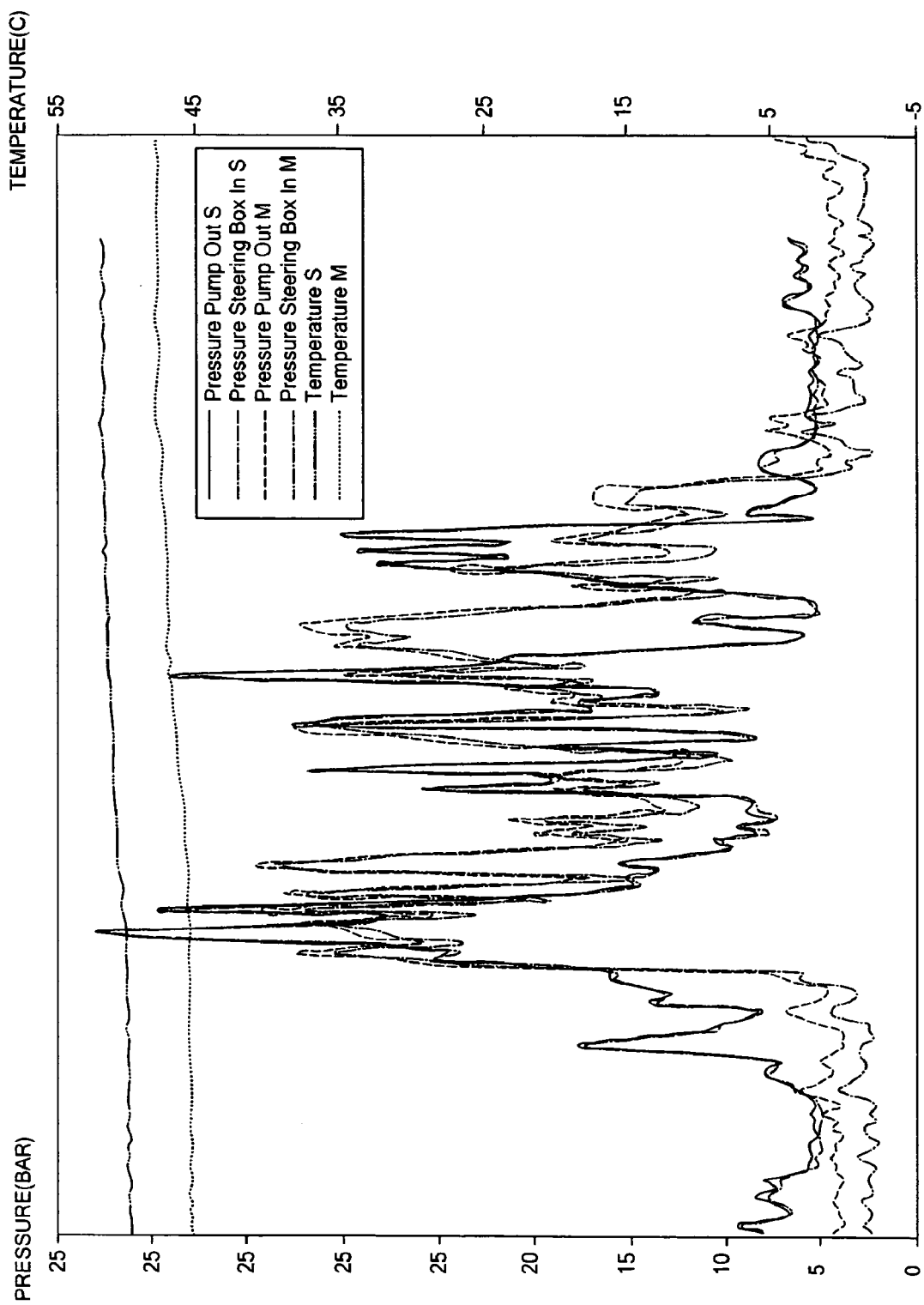

FIG. 9 is a graph relating to a test with the left hand tyres off the bitumen and road shoulder during a left hand sweeper turn. The vehicle was driven at approximately 45 km/h on the edge of the bitumen and gravel shoulder of the road while negotiating a left hand turn. The test attempts to show the corrections necessary by the driver when negotiating such a turn. Test Length—approximately 23 seconds.

The results of this test again show that a variation exists in the operating pressures of the high pressure side of the steering system from the standard to modified version of the subject vehicle. The standard vehicle's average operating pressure is approximately 2-3 bar (28-42 psi) higher than that of the modified vehicle. Additionally, the standard vehicle's operating temperature is approximately 4-5° C. higher than that of the modified vehicle.

The larger peaks in the chart indicate a steering input by the driver of the vehicle to either correct the path of the vehicle or a counteractive input by the driver in response to feedback received through the steering wheel from the steer tyres i.e. opposing the motion. The chart also shows that the steering characteristics when negotiating the turn have not been altered significantly but the peaks have been lowered marginally.

A variation of approximately 2 bar (28 psi) exists between the pressure at the pump output to the pressure at the inlet of the steering box on the modified vehicle. These pressures are almost identical on the standard vehicle.

Figure 10:
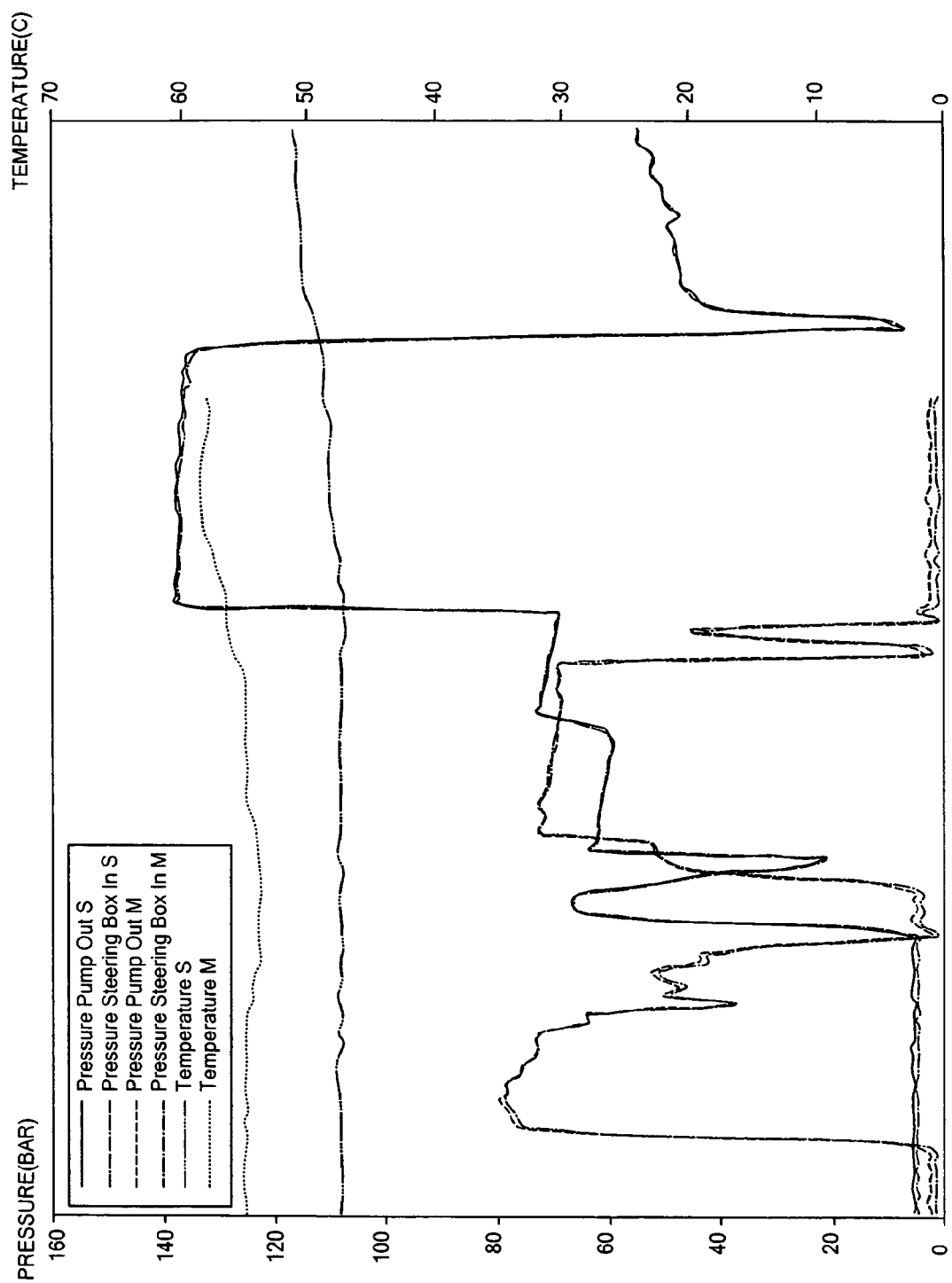

FIG. 10 shows the results for a stationary right hand steering lock test. The vehicle was positioned in the workshop on the concrete floor. A plate, approximately 6 mm thick, was placed between the steering stop on the front axle and the wheel stop. The steering wheel was turned to full right hand lock so that the stop made contact with the plate. The steering was held at full lock for approximately 5 seconds. This test was an attempt to determine peak pressures in the system allowing the relief valve on the steering box to release pressure.

The results of this test show a large variation in the peak pressures during the test between the standard vehicle and the modified vehicle. The standard vehicle reached a peak pressure of approximately 140 bar (2030 psi) whereas the modified vehicle reached peak pressures around 80 bar (1160 psi). The temperature is approximately 5-10° C. higher in the modified vehicle than the standard vehicle.

Figure 11:
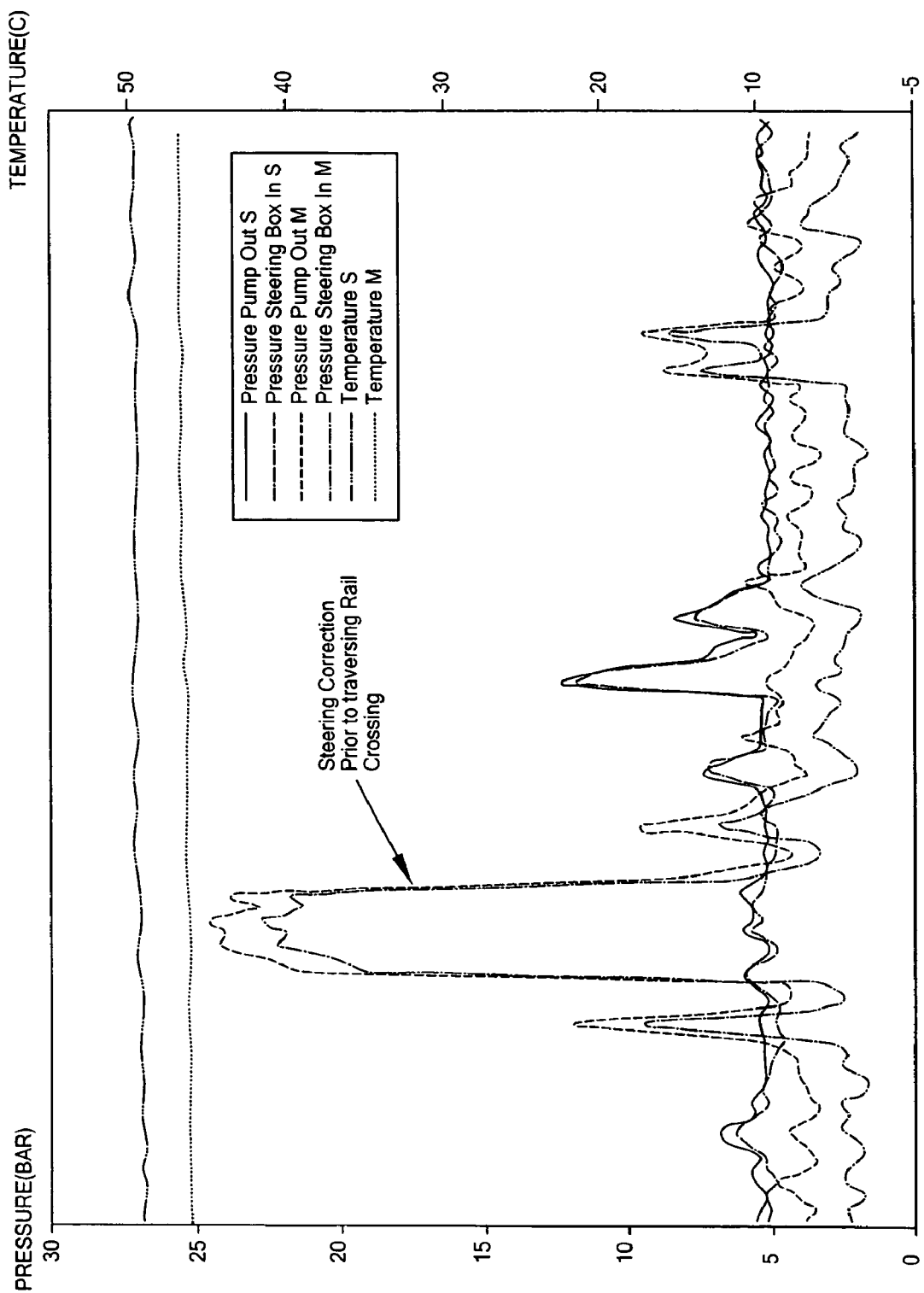

FIG. 11 is a test relating to a rail crossing. The vehicle was driven at approximately 60 km/h over a highly corrugated railway crossing. The test is an attempt to show feedback that the driver receives through the steering system under such circumstances. Test Length—approximately 12 seconds.

The test shows that a variation exists in the operating pressures of the high pressure side of the steering system from the standard to modified version of the subject vehicle. The standard vehicle's average operating pressure is approximately 2 bar (28 psi) higher than that of the modified vehicle. Additionally, the standard vehicle's operating temperature is approximately 3-4° C. higher than that of the modified vehicle.

The larger peak in the chart (for the modified vehicle) indicates a steering input by the driver of the vehicle to bring the vehicle into line on the road after passing another vehicle just before the rail crossing.

The peaks generated during the rail crossing have been reduced from the standard to modified vehicle and it should be noted that negligible driver input was undertaken during the crossing, i.e. the peaks are the response to the input from the steer tyres of the vehicle into the steering box.

A variation of approximately 2 bar (28 psi) exists between the pressure at the pump output to the pressure at the inlet of the steering box on the modified vehicle. These pressures are almost identical on the standard vehicle.

Figure 12:
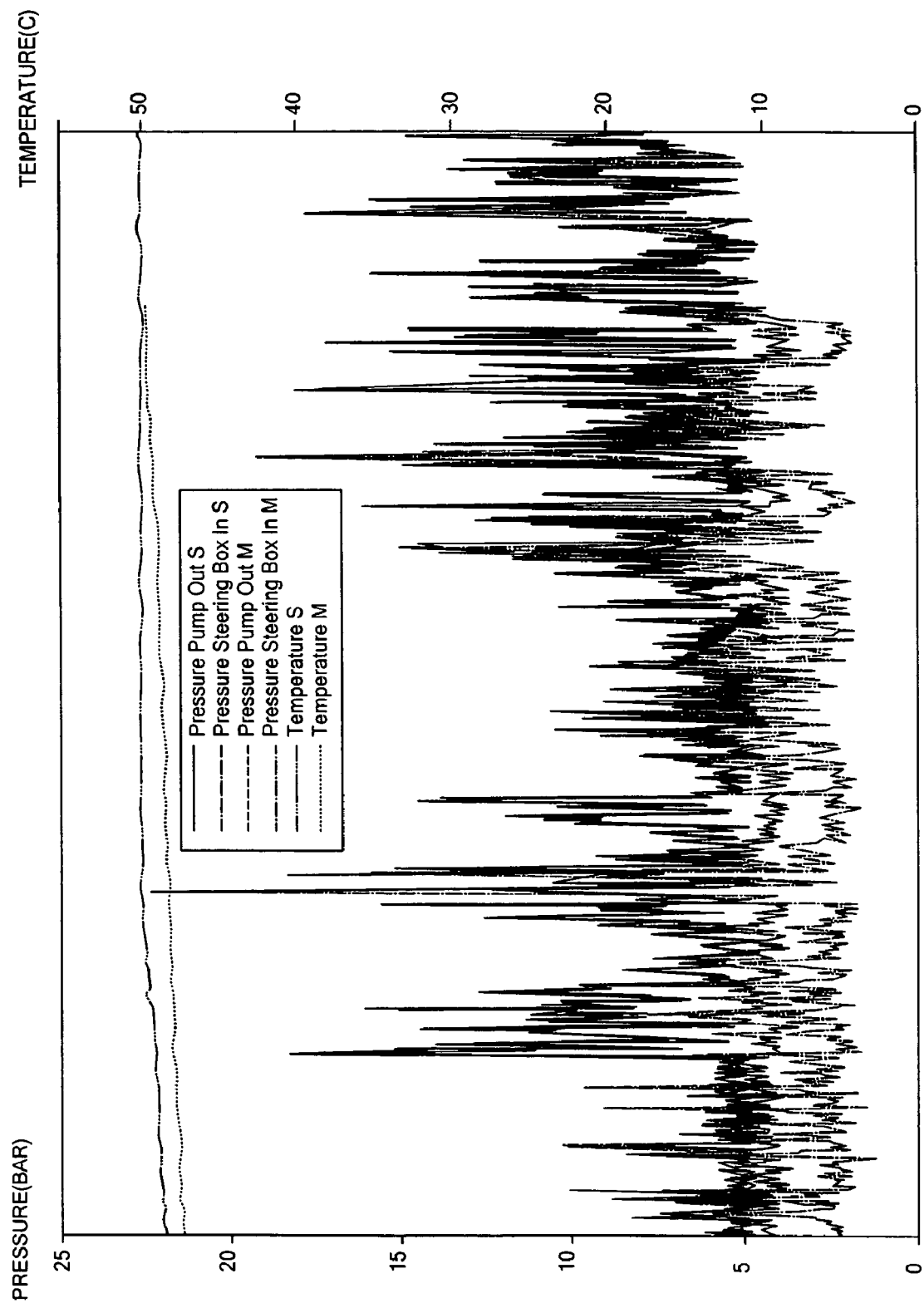

FIG. 12 is a graph relating to a test with the left hand tyres of the vehicle off the road bitumen and on a gravel shoulder and then the right hand tyres off the bitumen and on the gravel shoulder. The vehicle was driven at 80 km/h with the left hand tyres on the edge of the bitumen and gravel shoulder of the road and, subsequently, the vehicle was corrected to the centre of the road and then driven with the right hand tyres on the edge of the bitumen and gravel shoulder of the road. This test attempts to show the corrections necessary by the driver when negotiating this type of manoeuvre. Test Length—approximately 110 seconds.

The results of this test again show that a variation exists in the operating pressures of the high pressure side of the steering system from the standard to modified version of the subject vehicle. The standard vehicle's average operating pressure is approximately 2 bar (28 psi) higher than that of the modified vehicle. The temperature of the fluid in the reservoir is almost identical for both the standard and modified vehicle.

The larger peaks in the chart indicate a steering input by the driver of the vehicle to either correct the path of the vehicle or a counteractive input by the driver in response to feedback received through the steering wheel from the steer tyres i.e. opposing the motion.

A variation of approximately 2 bar (28 psi) exists between the pressure at the pump output to the pressure at the inlet of the steering box on the modified vehicle. These pressures are almost identical on the standard vehicle.

It is evident from this chart that significantly more driver input at higher pressures was required in the standard vehicle configuration as compared to the modified vehicle.

Figure 13:
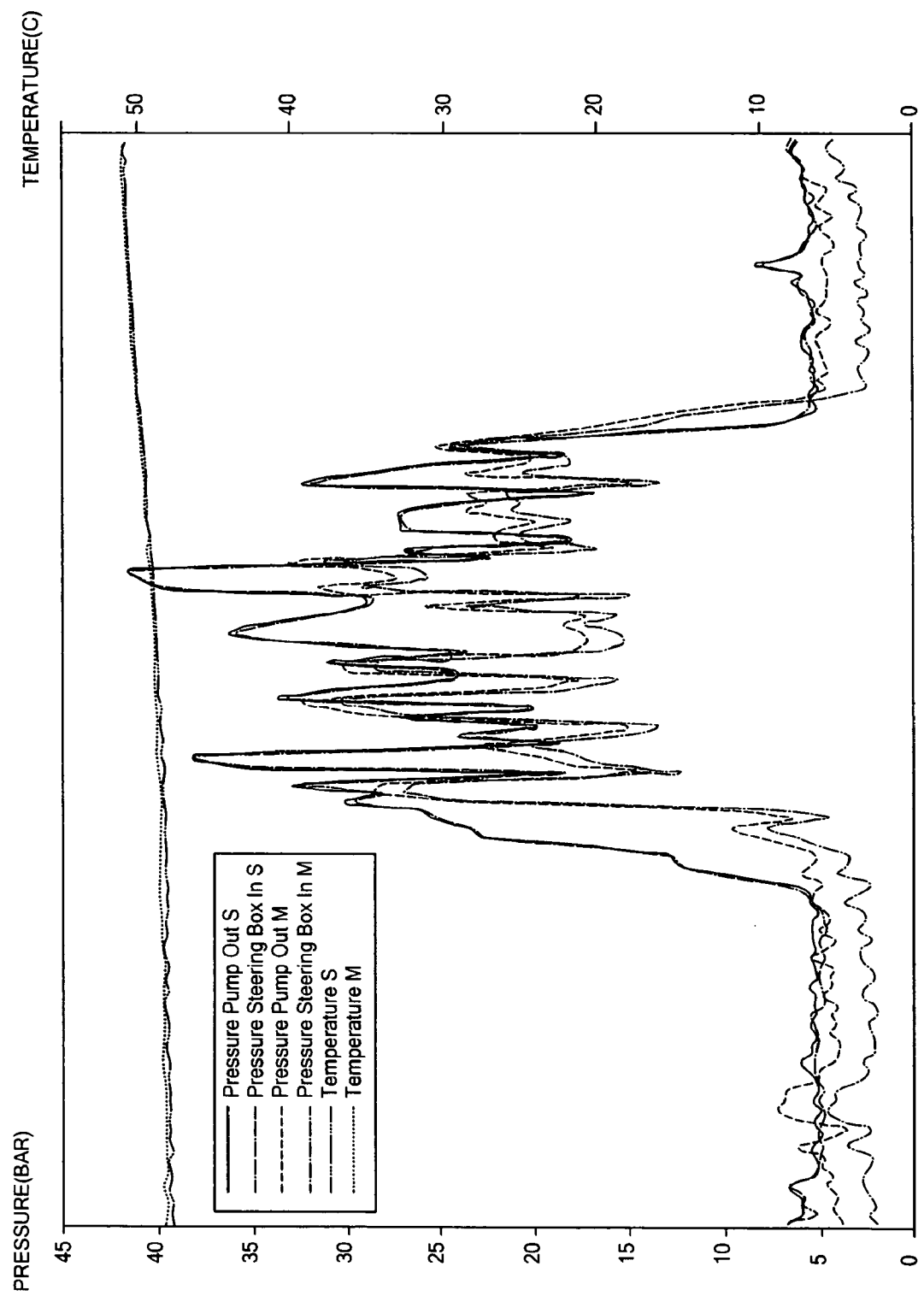

FIG. 13 is a graph showing left hand understeer sweeper. The vehicle was driven at approximately 80 km/h to negotiate a left hand sweeper bend which generates an understeer situation for the driver of the vehicle. This test attempts to replicate the corrections required by the driver to negotiate a bend in the road at a high speed. Test Length—approximately 16 seconds.

The results of this test again show that a variation exists in the operating pressures of the high pressure side of the steering system from the standard to modified version of the subject vehicle. The standard vehicle's average operating pressure is approximately 2 bar (28 psi) higher than that of the modified vehicle in a straight line but increases to approximately 10 bar (140 psi) during the bend. The temperature of the fluid in the reservoir is almost identical for both the standard and modified vehicle.

A variation of approximately 2 bar (28 psi) exists between the pressure at the pump output to the pressure at the inlet of the steering box on the modified vehicle. These pressures are almost identical on the standard vehicle.

Figure 14:
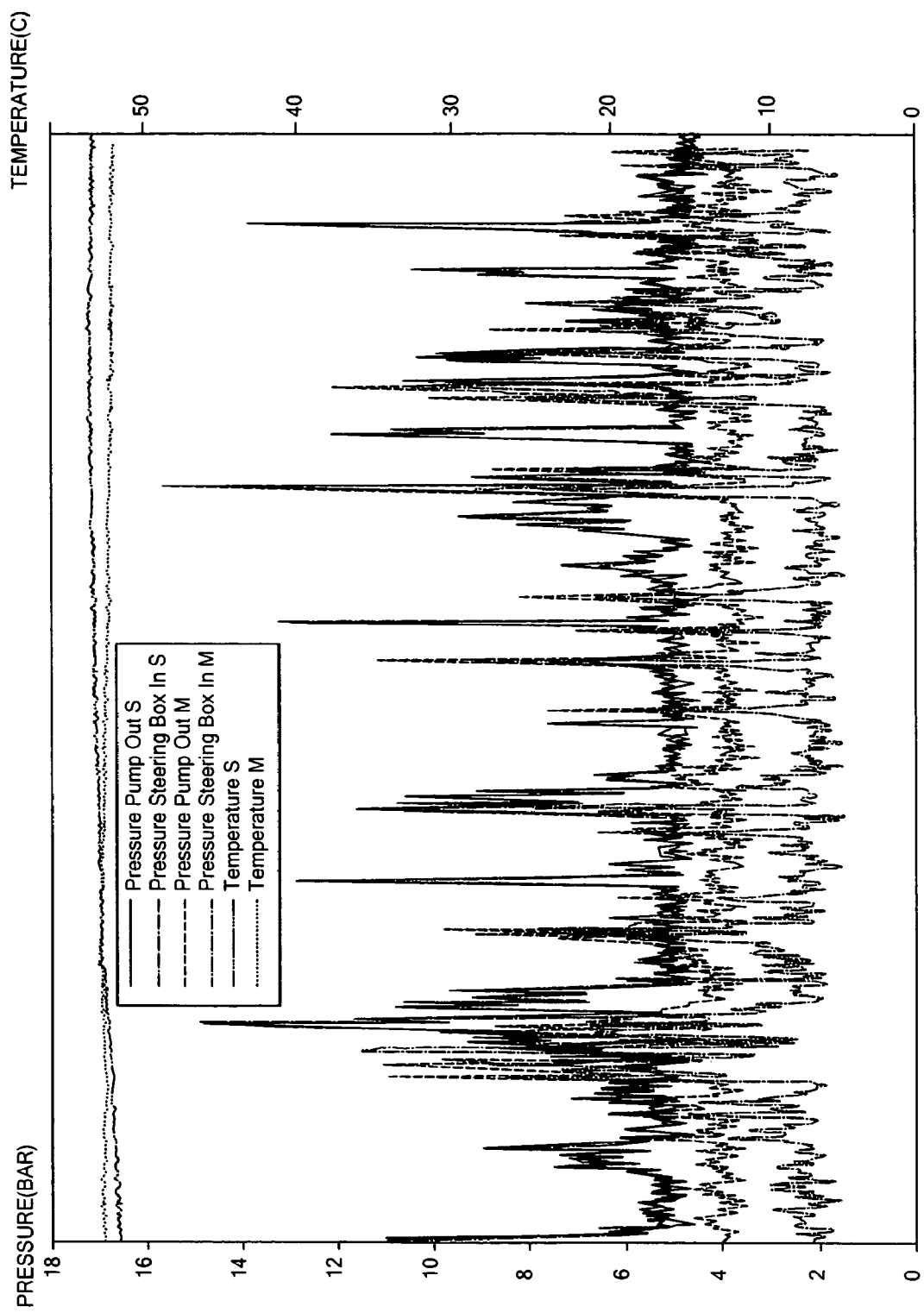

FIG. 14 is a test driving on a gravel road. The vehicle was driven at approximately 60 km/h along the gravel road. The test attempts to show the input from the road to the driver through the vehicle's steering system and hence the corrections required by the driver to maintain vehicle directional stability. Test Length—approximately 90 seconds.

The test results show that a variation exists in the operating pressures of the high pressure side of the steering system from the standard to modified version of the subject vehicle. The standard vehicle's average operating pressure is approximately 2 bar (28 psi) higher than that of the modified vehicle. The temperature of the fluid in the reservoir is almost identical for both the standard and modified vehicle.

Again, the larger peaks in the chart indicate a steering input by the driver of the vehicle to either correct the path of the vehicle or a counteractive input by the driver in response to feedback received through the steering wheel from the steer tyres i.e. opposing the motion.

Also, a variation of approximately 2 bar (28 psi) still exists between the pressure at the pump output to the pressure at the inlet of the steering box on the modified vehicle. These pressures are almost identical to the standard vehicle.

Figure 15:
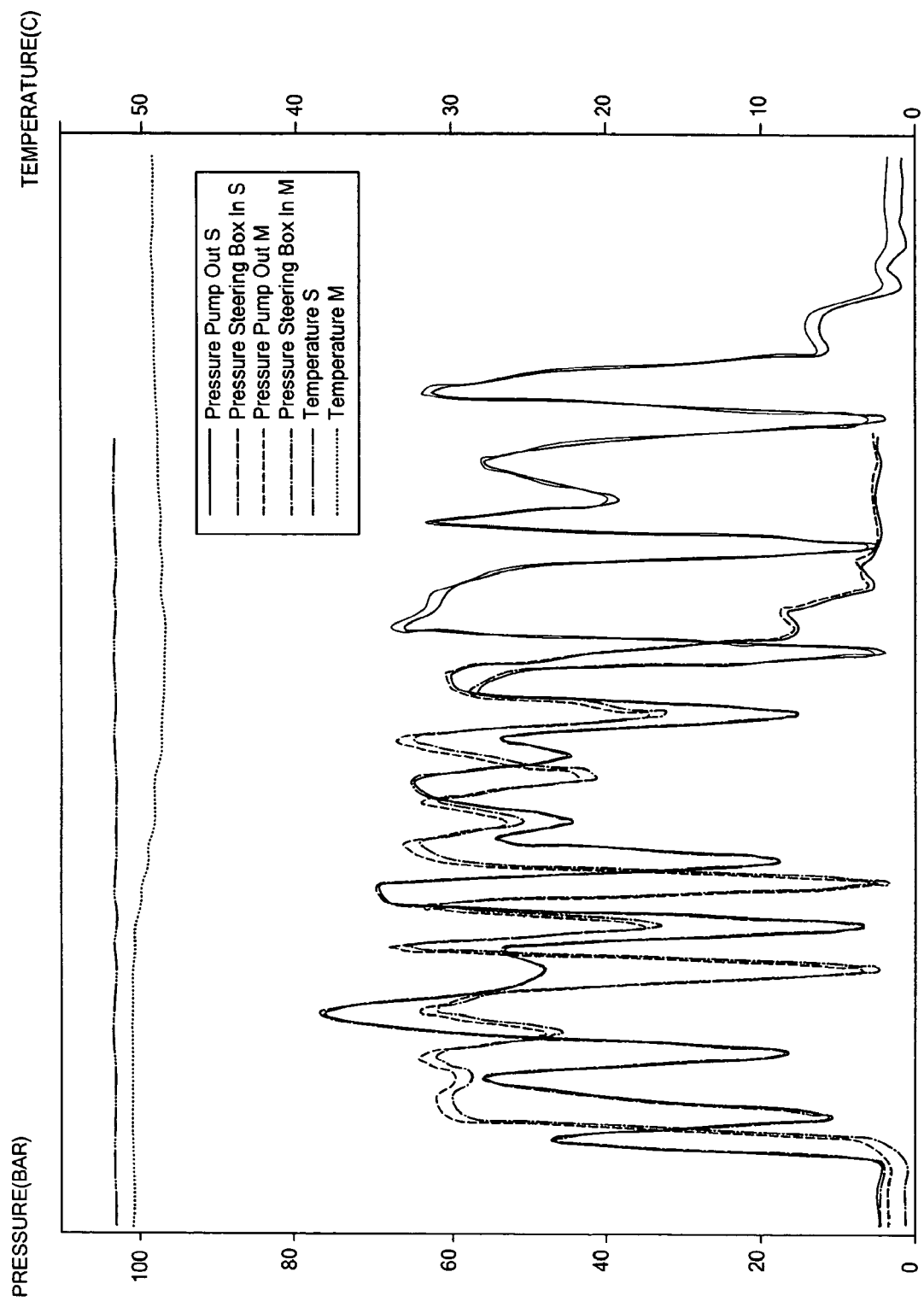

FIG. 15 relates to a test of a stationary steering side to side fast cycle. The vehicle was positioned on the gravel road and the steering wheel was turned from left to right approximately half a turn at a fast cycle speed. Test Length—approximately 10 seconds.

The results of this test do not show much variation in the peak pressures during the test between the standard vehicle and the modified vehicle. It should be noted that the pressure drops during reversal reach lower values in the modified vehicle. The temperature of the fluid in the reservoir is almost identical for both the standard and modified vehicle.

Figure 16:
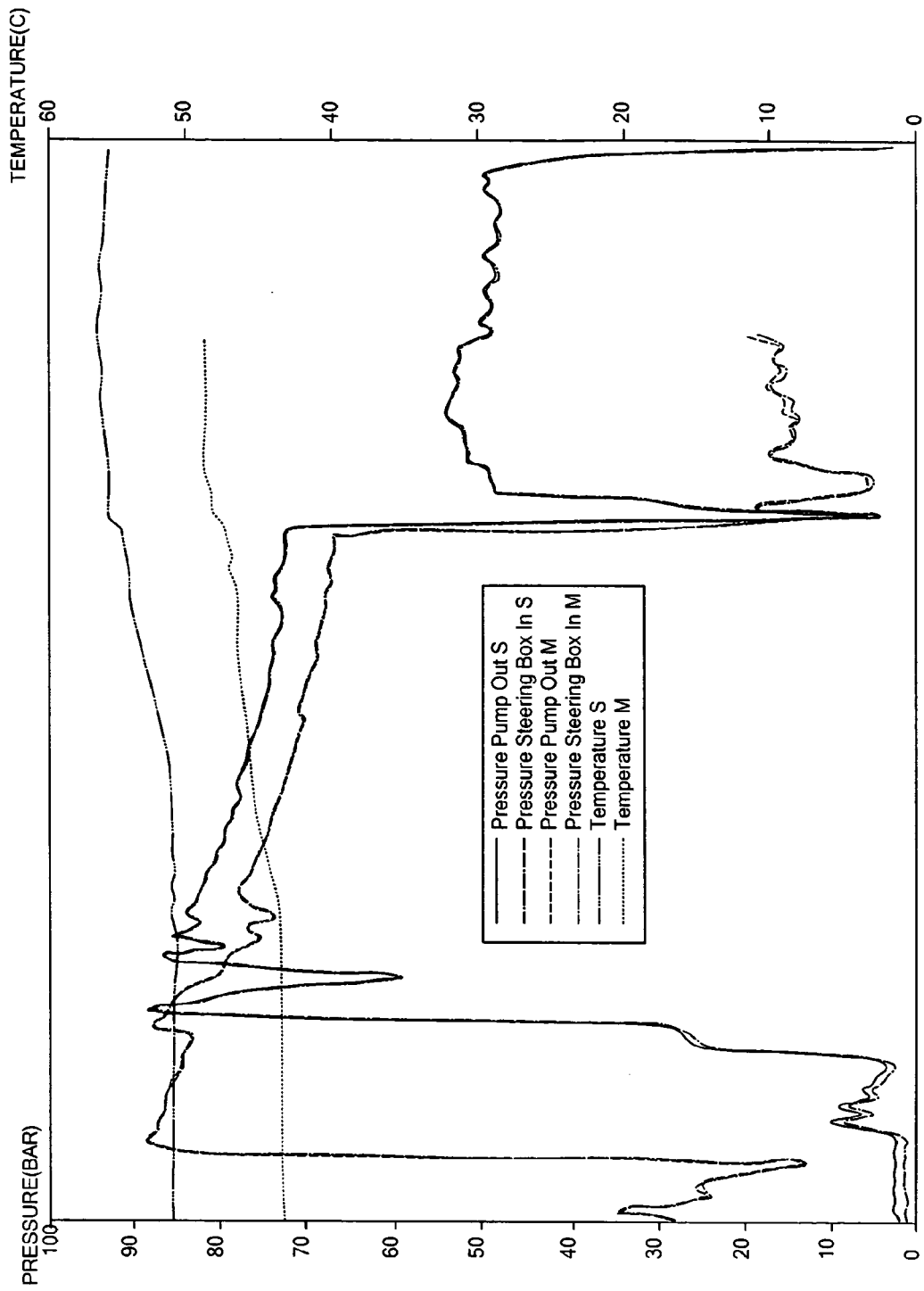

FIG. 16 relates to a stationary left hand steering lock test. The vehicle was positioned in the workshop on the concrete floor. A plate, approximately 6 mm thick, was placed between the steering stop on the axle. The steering wheel was turned to full left hand lock so that the stop made contact with the plate. The steering was held at full lock for approximately 5 seconds. This test was an attempt to determine peak pressures in the system allowing the relief valve on the steering box to release pressure.

The results of this test do not show much variation in the peak pressures during the test between the standard vehicle and the modified vehicle. The temperature is approximately 5° C. higher in the modified vehicle than the standard vehicle (this may be attributed to the ambient temperature at the time of the tests).

Figure 17:
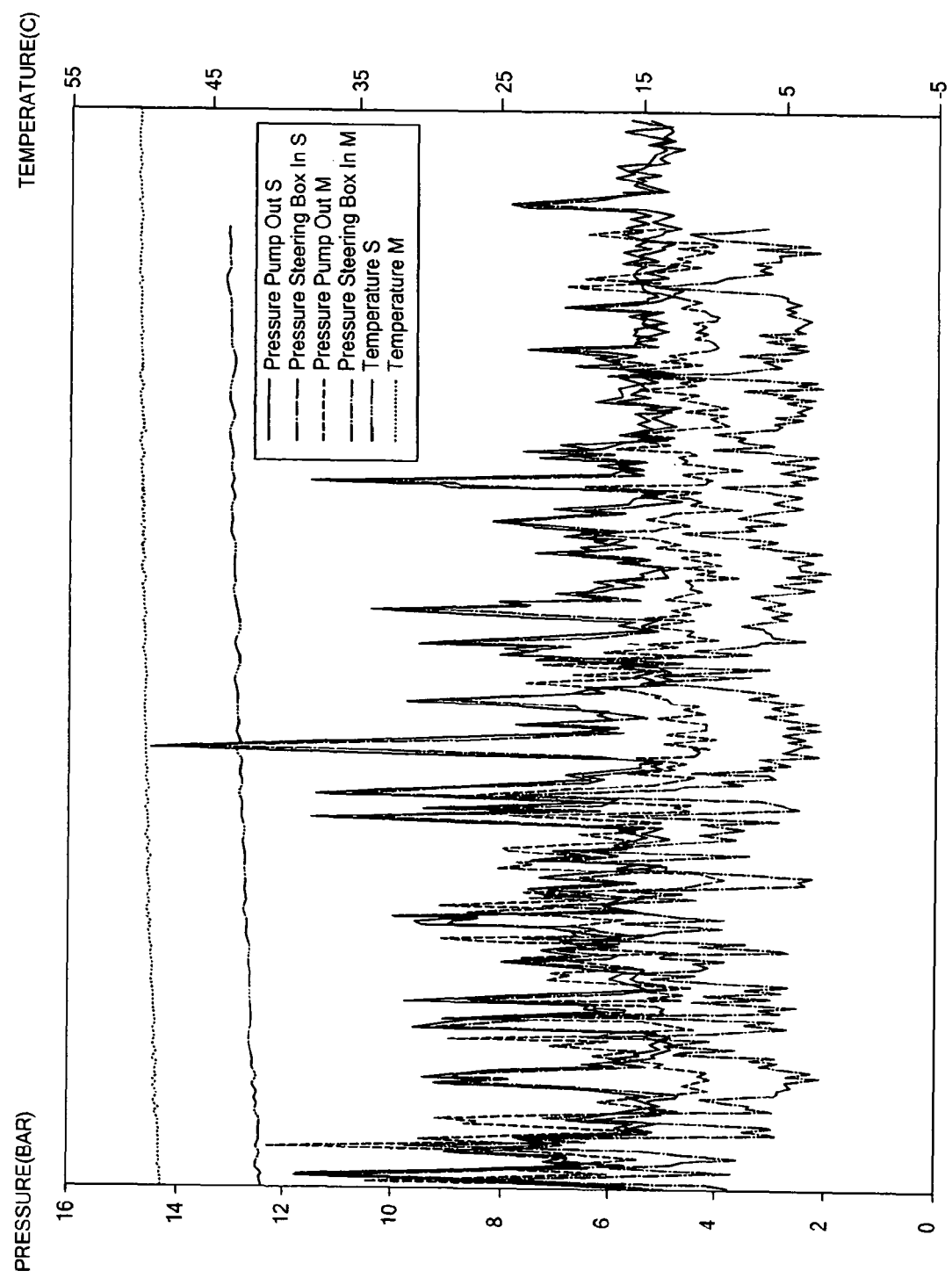

FIG. 17 is a test showing the tendency of the vehicle to follow road irregularities. The vehicle was driven at approximately 80 km/h. The test was an attempt to show the amount of driver input required to the steering of the vehicle to correct the vehicle's tendency to follow the road irregularities or "tram tracking". Test Length—approximately 45 seconds.

The results of this test show that a variation exists in the operating pressures of the high pressure side of the steering system from the standard to modified version of the subject vehicle. The standard vehicle's average operating pressure is approximately 1-2 bar (14-28 psi) higher than that of the modified vehicle. Additionally, the standard vehicle's operating temperature is approximately 5-7° C. higher than that of the modified vehicle.

The larger peaks in the chart indicate a steering input by the driver of the vehicle to either correct the path of the vehicle or a counteractive input by the driver in response to feedback received through the steering wheel from the steer tyres i.e. opposing the motion.

It is also worth noting that a variation of approximately 2 bar (28 psi) exists between the pressure at the pump output to the pressure at the inlet of the steering box on the modified vehicle. These pressures are almost identical on the standard vehicle.

A test was also conducted by driving the vehicle at 100 km/h for a distance of 8 km. A graph is not included to show the results because of the complexity of the traces and the fact that it is very difficult to distinguish one trace from another. However, the test results show that a variation exists in the operating pressures of the high pressure side of the steering system from the standard to modified version of the subject vehicle. The standard vehicle's average operating pressure is approximately 2 bar (28 psi) higher than that of the modified vehicle. The temperature of the fluid in the reservoir is slightly higher for the modified vehicle in comparison to the standard vehicle.

Again, the larger peaks in the chart indicate a steering input by the driver of the vehicle to either correct the path of the vehicle or a counteractive input by the driver in response to feedback received through the steering wheel from the steer tyres i.e. opposing the motion.

Also, a variation of approximately 2 bar (28 psi) still exists between the pressure at the pump output to the pressure at the inlet of the steering box on the modified vehicle. These pressures are almost identical on the standard vehicle.

The peaks in the standard configuration appear to be more frequent and larger in comparison to those of the modified vehicle over the drive cycle. It should be noted that approximately 30% of this test was completed with the driver not steering the vehicle i.e. allowing the vehicle to steer itself, and some of the larger peaks can be attributed to the correction necessitated by the driver having to bring the vehicle back onto the correct path on the road.

The above tests were conducted by modifying the standard vehicle by increasing the internal bore diameter of the steering pump to 4.5 mm from the original 3.57-3.97 mm, modifying the elbow fitting at the pump outlet by increasing the internal bore diameter to 10.5 mm and increasing the internal bore diameter of the inlet fitting to the power steering unit 5 to 10.5 mm.

It is thought that the concept of the invention improves steering performance because steering corrections are normally reactive, that is the driver reacts to an input which comes from the steered axle wheels, which means that the steering unit pitman arm 10 has been moved by a disturbance from the steering axle. This movement will cause the servo valve inside the steering unit 5 to also move in the same direction and admit pressurised oil to continue the movement originally generated by the disturbance. The first pressure signal that the servo-valve will transmit is the back pressure from the pump to the steering unit 5. This back pressure is higher than the back pressure between the steering unit 5 and the reservoir 2. The latter back pressure will be acting on the other side of the piston and hence, the piston force generated will be greater and possibly more sudden than the force generated by the driver's input. That is, the driver will receive a more amplified control demand. By increasing the size of the flow path in accordance with concept of this invention, this amplification is lowered.

Furthermore, the present invention decreases the back pressure between the pump and the power steering unit 5. The pressure existing in the steering unit piston chambers are lower and any road disturbances are felt as softer by the driver. Since road disturbances generally are transient, their effects disappear quickly and may not even have been noticed by the driver. That is, the steering jerk effect is removed.

Test Example 2

The equipment used for pressure flow and temperature control was: Websters pressure flow & temperature control unit of 30 litres plus per minute capacity.

The vehicle in question was a Kenworth T404, 2002 model with a six tonne front axle and Caterpillar C-15 engine.

This vehicle was fitted with a Tas Steering Box, being 85124A, 09402A in 266. Also, a TRW steering pump of 20 litres per minute with an outlet orifice of 4.5 ml as per factory settings.

This vehicle had brand new pressure and return hydraulic lines fitted 2 days prior to testing.

The lines fitted were exceptional in size including end fittings measuring 26 ml outside and a clear 12 ml inside diameter.

The first test was to evaluate oil flow pressure and temperature.

First Test:
Flow rate 18 litres per minute at 650 RPM an increase of 2 litres to 20 litres per minutes at 1200 RPM and beyond. Tests were as per standard Kenworth factory fitment.

Second Test:
Was to enlarge the hydraulic fitting into the steering unit from standard size of 12 ml×9.5 ml, to 12 ml×10 ml and evaluate flow pressure. In the test vehicle this fitting corresponds to fitting 37 in FIG. 1 but rather than being an elbow fitting it was in fact a straight fitting of the type shown in FIG. 6 which had a maximum bore of 12 mm and a minimum bore of 9.5 mm prior to adjustment.

Results: no visible difference on gauges in pressure and flow.

However, a reduction in steering effort of about 10% was immediately noticed being freer and lighter with reduced drag. Vehicle was stationary.

Third Test:
Was to enlarge the straight hydraulic fitting from the steering pump, from the standard 12 ml×9.5 ml to that of 12 ml to 10 ml and recorded at idle speed of 650 RPM. This fitting corresponds to the fitting 36 in FIG. 1 and again rather than being an elbow fitting as shown in FIG. 1 it is in fact a straight fitting of the type shown in FIG. 6. No change in flow at 650 rpm at idle speed, but an increase of around 2 litres per minute was evident. at 1200 RPM and beyond. A slight reduction in oil pressure was visible from 2000 PSI to just under 2000 PSI. No appreciable change in steering effort compared to second test.

Fourth Test:
Was to increase the already modified straight fitting from the pump to a further 0.5 ml from 12 ml to 10.5 ml and evaluate results.

No recorded difference in flow pressure and steering effort compared to second test.

Fifth Test:
Was to increase the remaining straight fitting into steering unit, from the already 12 ml×10 ml to 12 ml×10.5 ml, and recorded.

Again there was no visible change in flow pressure or steering effort compared to second test.

Oil temperature during testing remained at 42 degrees Celsius.

Results:
This vehicle, although handled and behaved in a manner quite acceptable to its owner and driver, was greatly enhanced in all aspects of handling, comfort and predictability.

Summary:
As these tests reveal, the complete change in this vehicles characteristics and behaviour was bought about by enlarging one hydraulic fitting by 0.5 ml.

As the steering effort was reduced and recorded after the first test, at idle speed of 650 RPM it is believed that the enlargement of the fitting into the steering unit alone has achieved all of the above In the claims which follow and in the preceding description of the invention, except where the context requires otherwise due to express language or necessary implication, the word "comprise", or variations such as "comprises" or "comprising", is used in an inclusive sense, i.e. to specify the presence of the stated features but not to preclude the presence or addition of further features in various embodiments of the invention.

Since modifications within the spirit and scope of the invention may readily be effected by persons skilled within the art, it is to be understood that this invention is not limited to the particular embodiment described by way of example hereinabove.

The invention claimed is:

1. A method of improving performance of a vehicle which has a hydraulic power steering system for driving steered wheels, the system comprising:
   a hydraulic fluid reservoir, a pump for pumping hydraulic fluid from the reservoir and a steering unit operably connected to a mechanical steering system and to be activated by supply of hydraulic fluid by the pump to the steering unit;
   the hydraulic power steering system having a flow path for supply of hydraulic fluid by the pump to the steering unit at a specific quantum of flow, said method comprising:
   modifying the system by increasing the effective cross-section of the flow path for the supply of hydraulic fluid from the pump to the steering unit to decrease the circuit pressure for the quantum of flow of hydraulic fluid to the steering unit to thereby reduce the feedback effect generated by the steered wheels of the vehicle,
   wherein the steering system includes a hydraulic fitting attached to the pump for connecting the pump to a supply line, and a hydraulic fitting connected to the steering unit for connecting the supply line to the steering unit, and the step of increasing the bore size of the hydraulic fittings.

2. The method of claim 1 wherein the step of modifying the flow path comprises changing a component of the flow path to increase the cross-section of the flow path.

3. The method of claim 1 wherein the step of modifying the size of the flow path comprises altering a component of the flow path to increase the cross-section of the flow path.

4. The method of claim 1 wherein the bore size is increased to a size from about 9.8 to 10.8 mm.

5. The method of claim 4 wherein the bore size is increased to a size from about 9.8 to 10.5 mm.

6. The method of claim 5 wherein the bore size is increased to about 10.0 mm.

7. The method of claim 1 wherein the cross-section of the flow path is increased by altering one component of the flow path by increasing the cross-section of the flow path provided by that component by an amount from 8 to 14%.

8. The method of claim 7 wherein the cross-section of the flow path is increased by an amount from about 11.5 to 11.8%.

9. The method of claim 1 wherein the increase in cross-section is provided by modifying the cross-section of the flow path of one component of the flow path, the said one component having a plurality of holes and wherein the flow path is increased in cross-section by an amount of 20% to 45% for a hole size of 3 mm substantially linearly down to from 10% to 20% for a hole size of about 5 mm.

10. The method of claim 9 wherein the cross-section is increased in the range of 36% down to 16.5% for hole sizes of 3 mm to 5 mm respectively.

11. The method of claim 10 wherein the increase is provided by increasing the diameter of the holes by about 0.5 mm.

12. The method of claim 11 wherein if a larger hole of from 6 to 8 mm is also provided in the component, the method also comprises increasing the size of that hole by increasing the diameter about 1 mm.

13. A method of improving performance of a vehicle which has a hydraulic power steering system for driving steered wheels, the system comprising:
a hydraulic fluid reservoir, a pump for pumping hydraulic fluid from the reservoir and a steering unit operably connected to a mechanical steering system and to be activated by supply of hydraulic fluid by the pump to the steering unit;
the hydraulic power steering system having a flow path for supply of hydraulic fluid by the pump to the steering unit at a specific quantum of flow, said method comprising:
modifying the system by increasing the effective cross-section of the flow path for the supply of hydraulic fluid from the pump to the steering unit to decrease the circuit pressure for the quantum of flow of hydraulic fluid to the steering unit to thereby reduce the feedback effect generated by the steered wheels of the vehicle, wherein the effective cross-section of the flow path is increased by changing a component of the flow path.

14. The method of claim 13 wherein the steering system includes a hydraulic fitting attached to the pump for connecting the pump to a supply line, and a hydraulic fitting connected to the steering unit for connecting the supply line to the steering unit, and the step of increasing the bore size of the hydraulic fittings.

15. The method of claim 14 wherein the bore size is increased to a size from about 9.8 to 10.8 mm.

16. The method of claim 15 wherein the bore size is increased to a size from about 9.8 to 10.5 mm.

17. The method of claim 16 wherein the bore size is increased to about 10.0 mm.

18. A method of improving performance of a vehicle which has a hydraulic power steering system for driving steered wheels, the system comprising:
a hydraulic fluid reservoir, a pump for pumping hydraulic fluid from the reservoir and a steering unit operably connected to a mechanical steering system and to be activated by supply of hydraulic fluid by the pump to the steering unit;
the hydraulic power steering system having a flow path for supply of hydraulic fluid by the pump to the steering unit at a specific quantum of flow, said method comprising:
modifying the system by increasing the effective cross-section of the flow path for the supply of hydraulic fluid from the pump to the steering unit to decrease the circuit pressure for the quantum of flow of hydraulic fluid to the steering unit to thereby reduce the feedback effect generated by the steered wheels of the vehicle, wherein the increase in cross-section is provided by modifying the cross-section of the flow path of one component of the flow path, the said one component having a plurality of holes and wherein the flow path is increased in cross-section by an amount of 20% to 45% for a hole size of 3 mm substantially linearly down to from 10% to 20% for a hole size of about 5 mm.

19. The method of claim 18 wherein the cross-section is increased in the range of 36% down to 16.5% for hole sizes of 3 mm to 5 mm respectively.

20. The method of claim 19 wherein the increase is provided by increasing the diameter of the holes by about 0.5 mm.

21. The method of claim 20 wherein if a larger hole of from 6 to 8 mm is also provided in the component, the method also comprises increasing the size of that hole by increasing the diameter about 1 mm.

22. The method of claim 18 wherein the steering system includes a hydraulic fitting attached to the pump for connecting the pump to a supply line, and a hydraulic fitting connected to the steering unit for connecting the supply line to the steering unit, and the step of increasing the bore size of the hydraulic fittings.

23. The method of claim 22 wherein the bore size is increased to a size from about 9.8 to 10.8 mm.

24. The method of claim 23 wherein the bore size is increased to a size from about 9.8 to 10.5 mm.

25. The method of claim 24 wherein the bore size is increased to about 10.0 mm.

* * * * *